US010533708B2

United States Patent
Okuno et al.

(10) Patent No.: US 10,533,708 B2
(45) Date of Patent: Jan. 14, 2020

(54) GAS SUPPLY SYSTEM, HYDROGEN STATION INCLUDING THE SAME, ACCUMULATOR LIFE JUDGEMENT METHOD, AND USE METHOD OF GAS SUPPLY SYSTEM

(71) Applicant: Kobe Steel, Ltd., Hyogo (JP)

(72) Inventors: Takashi Okuno, Takasago (JP); Kenji Nagura, Takasago (JP)

(73) Assignee: Kobe Steel, Ltd., Hyogo (JP)

(*) Notice: Subject to any disclaimer, the term of this patent is extended or adjusted under 35 U.S.C. 154(b) by 360 days.

(21) Appl. No.: 15/067,570

(22) Filed: Mar. 11, 2016

(65) Prior Publication Data

US 2016/0265720 A1 Sep. 15, 2016

(30) Foreign Application Priority Data

Mar. 13, 2015 (JP) ................................ 2015-050744

(51) Int. Cl.
*F17C 5/06* (2006.01)
*F17C 13/02* (2006.01)
(Continued)

(52) U.S. Cl.
CPC .................. *F17C 5/06* (2013.01); *F17C 7/00* (2013.01); *F17C 13/02* (2013.01); *F17C 13/12* (2013.01);
(Continued)

(58) Field of Classification Search
CPC .... F17C 5/06; F17C 7/00; F17C 13/02; F17C 13/03; F17C 12/12
(Continued)

(56) References Cited

U.S. PATENT DOCUMENTS 4,487,226 A * 12/1984 Chun ........................ F15B 1/08
138/30
5,169,295 A * 12/1992 Stogner ................. F04B 9/1174
417/339
(Continued)

FOREIGN PATENT DOCUMENTS

| JP | S58-211625 A | 12/1983 |
|---|---|---|
| JP | S64-021226 U | 2/1989 |

(Continued)

OTHER PUBLICATIONS

"Mechanical Materials and Their Mechanical Properties and Test Methods", The Society of Materials Science, Japan, pp. 116-117, 9th edition published on Mar. 31, 1989.
(Continued)

*Primary Examiner* — Timothy L Maust
*Assistant Examiner* — James R Hakomaki
(74) *Attorney, Agent, or Firm* — Studebaker & Brackett PC

(57) ABSTRACT

The present invention is to properly manage life of an accumulator and extend the life of the accumulator.
A gas supply system includes a control section, an acquiring section, a classifying section, and a judging section. The acquiring section acquires stress amplitude of accumulators from a pressure difference between first pressure on the gas storage side and second pressure on the gas lead-out side. The classifying section classifies the stress amplitude into a plurality of groups. The judging section divides the calculated acquirement number $n_i$ of the stress amplitude for each of the groups by the predetermined breaking cycle number $N_i$, and determines a fatigue degree $\Sigma n_i/N_i$. In a case where this value becomes a predetermined threshold value or more, the judging section judges that the accumulator comes to the end of the life.

16 Claims, 9 Drawing Sheets

(51) Int. Cl.
  *F17C 7/00* (2006.01)
  *F17C 13/12* (2006.01)
(52) U.S. Cl.
  CPC .............. *F17C 2203/0604* (2013.01); *F17C 2203/0639* (2013.01); *F17C 2203/0646* (2013.01); *F17C 2203/0663* (2013.01); *F17C 2205/0107* (2013.01); *F17C 2205/0146* (2013.01); *F17C 2205/0169* (2013.01); *F17C 2205/0323* (2013.01); *F17C 2205/0335* (2013.01); *F17C 2221/012* (2013.01); *F17C 2223/0123* (2013.01); *F17C 2223/033* (2013.01); *F17C 2223/035* (2013.01); *F17C 2223/036* (2013.01); *F17C 2225/0123* (2013.01); *F17C 2225/033* (2013.01); *F17C 2225/035* (2013.01); *F17C 2225/036* (2013.01); *F17C 2227/0157* (2013.01); *F17C 2227/0164* (2013.01); *F17C 2227/0337* (2013.01); *F17C 2227/0341* (2013.01); *F17C 2227/0397* (2013.01); *F17C 2227/041* (2013.01); *F17C 2227/043* (2013.01); *F17C 2250/01* (2013.01); *F17C 2250/032* (2013.01); *F17C 2250/043* (2013.01); *F17C 2250/0434* (2013.01); *F17C 2250/0439* (2013.01); *F17C 2250/0469* (2013.01); *F17C 2250/0495* (2013.01); *F17C 2250/0694* (2013.01); *F17C 2260/013* (2013.01); *F17C 2260/015* (2013.01); *F17C 2260/017* (2013.01); *F17C 2265/061* (2013.01); *F17C 2265/063* (2013.01); *F17C 2265/065* (2013.01); *F17C 2270/0139* (2013.01); *F17C 2270/0178* (2013.01); *F17C 2270/0184* (2013.01); *Y02E 60/321* (2013.01)

(58) Field of Classification Search
  USPC ............................................................ 141/18
  See application file for complete search history.

(56) References Cited

U.S. PATENT DOCUMENTS

| | | | | |
|---|---|---|---|---|
| 6,119,074 | A * | 9/2000 | Sarangapani | G05B 23/0232 701/1 |
| 6,442,511 | B1 * | 8/2002 | Sarangapani | G06F 11/008 340/870.01 |
| 6,990,431 | B2 * | 1/2006 | Beaudoin | G01N 35/00594 700/130 |
| 8,037,653 | B2 * | 10/2011 | Hohmann, Jr. | E04B 1/4178 52/379 |
| 8,991,445 | B2 * | 3/2015 | Nakazawa | H01M 8/04201 141/197 |
| 2005/0003246 | A1 * | 1/2005 | Shimada | F17C 11/005 95/106 |
| 2007/0202367 | A1 * | 8/2007 | Yoshida | H01M 8/04089 429/434 |
| 2007/0227614 | A1 * | 10/2007 | Kurita | B60S 5/02 141/26 |
| 2008/0148853 | A1 * | 6/2008 | Kim | F17C 13/02 73/587 |
| 2009/0047553 | A1 * | 2/2009 | Kizaki | H01M 8/04089 429/410 |
| 2010/0193070 | A1 * | 8/2010 | Allidieres | F17C 5/06 141/11 |
| 2011/0167921 | A1 * | 7/2011 | Wada | G01N 3/32 73/807 |
| 2012/0216910 | A1 * | 8/2012 | Inagi | F17C 5/06 141/4 |
| 2012/0216915 | A1 * | 8/2012 | Takata | F17C 5/06 141/82 |
| 2012/0255948 | A1 | 10/2012 | Kanezaki et al. | |
| 2012/0318403 | A1 | 12/2012 | Cohen et al. | |
| 2013/0037165 | A1 * | 2/2013 | Okawachi | F17C 5/06 141/4 |
| 2014/0060030 | A1 * | 3/2014 | Ma | E02F 9/123 60/413 |
| 2014/0124039 | A1 * | 5/2014 | Bartlok | F15B 1/04 137/14 |

FOREIGN PATENT DOCUMENTS

| | | | | |
|---|---|---|---|---|
| JP | 2005-003554 | A | | 1/2005 |
| JP | 2008032053 | A | * | 2/2008 |
| JP | 2008-064160 | A | | 3/2008 |
| JP | 2011-074925 | A | | 4/2011 |
| JP | 2011-132876 | A | | 7/2011 |
| JP | 4744285 | B2 | | 8/2011 |
| JP | 2013-002635 | A | | 1/2013 |
| JP | WO 2013001824 | A1 | * | 1/2013 ........ H01M 8/04208 |
| JP | 2013-024287 | A | | 2/2013 |
| JP | 5409688 | B2 | | 2/2014 |
| KR | 2013-0050820 | A | | 5/2013 |

OTHER PUBLICATIONS

The American Society of Mechanical Engineers, 2013 ASME Boiler and Pressure Vessel Code An International Code, III Rules for Construction of Nuclear Facility Components, Division 1—Subsection NB, Class 1 Components, pp. 36-61.
"Pressure Engineering", Journal of Japan High Pressure Institute, pp. 2639-2651, vol. 10, No. 2, (1972).

* cited by examiner

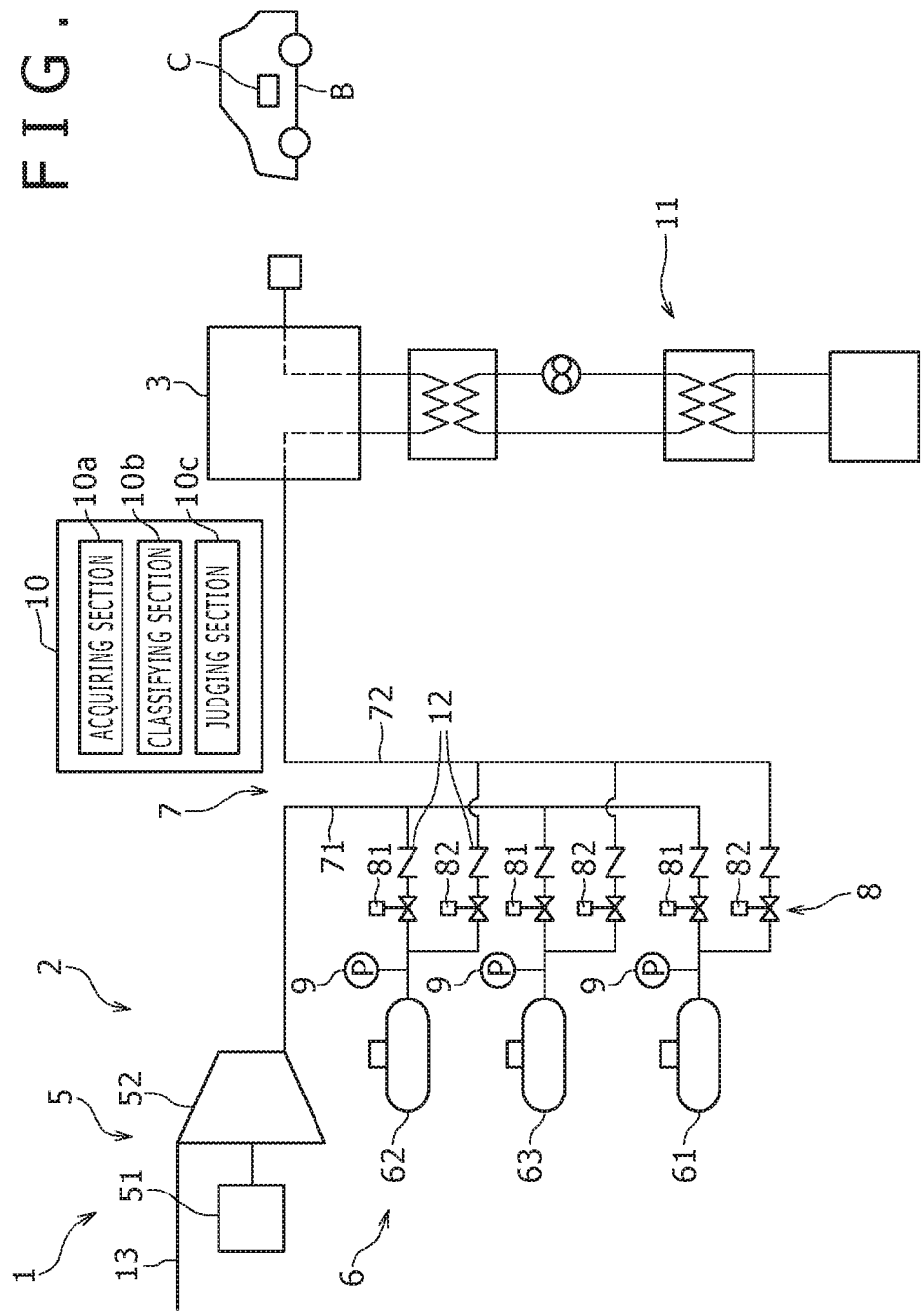
F I G . 1

GAS SUPPLY SYSTEM, HYDROGEN STATION INCLUDING THE SAME, ACCUMULATOR LIFE JUDGEMENT METHOD, AND USE METHOD OF GAS SUPPLY SYSTEM

BACKGROUND OF THE INVENTION

Field of the Invention

The present invention relates to a gas supply system, a hydrogen station, an accumulator life judgment method, and a use method of the gas supply system.

Description of the Related Art

In recent years, a hydrogen station for filling a vehicle such as a fuel cell vehicle with hydrogen is developed. As described in JP2011-132876 A, a hydrogen station includes an accumulator unit including an accumulator that stores a hydrogen gas in a compressed state, a hydrogen compression device communicating with the accumulator, the hydrogen compression device that pressure-feeds the hydrogen gas to the accumulator, and a dispenser communicating with the accumulator, the dispenser that supplies the hydrogen gas stored in the accumulator to a fuel cell vehicle.

A method of judging fatigue life of the accumulator utilized in the hydrogen station is recently being studied. As one example of the method, it is thought to judge that the accumulator comes to the end of the fatigue life in a case where the number of a pressure change acting on the accumulator (the measurement number of stress amplitude) reaches the breaking cycle number.

However, with the above method, the measurement number of the stress amplitude is counted up for every time when the stress amplitude is generated irrespective of the magnitude of the stress amplitude. Thus, according to circumstances where the accumulator is operated, even when a state where the pressure change is small is continued, the acquirement number by which the stress amplitude is acquired is counted up. Therefore, there is a possibility that the accumulator is replaced before the accumulator actually comes to the end of the fatigue life. As a result, replacement frequency of the accumulator is not easily reduced. Thereby, management cost of the hydrogen station is not easily reduced.

SUMMARY OF THE INVENTION

The present invention is achieved in consideration with the above problem, and a major object thereof is to properly manage life of an accumulator, and another object thereof is to extend the life of the accumulator.

A gas supply system according to a first aspect of the present invention is a gas supply system for supplying a gas to a filling facility that fills a tank of a tank-equipped device with the gas, the gas supply system including an accumulator unit that stores the gas, the accumulator unit having at least one accumulator, a gas delivery section that delivers the gas to the accumulator unit, a first valve member that opens and closes a lead-in flow passage providing communication between the accumulator unit and the gas delivery section, a second valve member that opens and closes a lead-out flow passage providing communication between the accumulator unit and the filling facility, an acquiring section that repeatedly acquires stress amplitude between stress acting on the accumulator in a state where the first valve member is closed and the second valve member is opened and stress acting on the accumulator in a state where the first valve member is opened and the second valve member is closed, a classifying section that classifies the stress amplitude into a plurality of groups, and a judging section that judges life of the accumulator based on a fatigue degree obtained by obtaining values from the acquirement number of the stress amplitude for each of the groups and the breaking cycle number corresponding to the stress amplitude representing the group, and adding the values up for each of the groups.

In the gas supply system of the present invention, focusing on the magnitude of the stress amplitude of the stress acting on the accumulator, the acquirement number of the stress amplitude is determined for each magnitude of the stress amplitude and used for judging the life of the accumulator. That is, the stress amplitude of the stress acting on the accumulator at the time of storing the gas in the accumulator and at the time of supplying the gas to the filling facility is classified into the plurality of groups by the magnitude thereof by the classifying section, and the judging section judges the life of the accumulator based on the fatigue degree obtained by obtaining the values from the acquirement number of the stress amplitude for each of the groups and the breaking cycle number corresponding to the stress amplitude representing the group, and adding the values up for each of the groups. Thereby, while respectively individually considering fatigue life due to large stress amplitude of the stress acting on the accumulator and fatigue life due to small stress amplitude, the life of the accumulator can be more properly managed, so that replacement frequency of the accumulator can be reduced. As a result, management cost of a hydrogen station can be reduced.

Preferably, the accumulator unit includes a first accumulator, and a second accumulator, the judging section determines remaining life of the first accumulator and remaining life of the second accumulator from the fatigue life, and one of the first accumulator and the second accumulator having the longer remaining life is used in a case where pressure of the tank is within a low pressure region serving as a range of predetermined low pressure, and the accumulator having the shorter remaining life is used in a case where the pressure of the tank is within a high pressure region serving as a range of predetermined high pressure, the high pressure region being narrower than the low pressure region.

In a case where the pressure of the tank of the tank-equipped device is within the low pressure region, a large amount of the gas is delivered from the accumulator to the filling facility. Thus, the stress amplitude acting on the accumulator is increased and the accumulator is prone to fatigue. Therefore, as described above, one of the first accumulator and the second accumulator having the longer remaining life becomes the accumulator to be used in the low pressure region. Meanwhile, in a case where the pressure of the tank is within the high pressure region, a delivery amount of the gas from the accumulator to the filling facility is relatively reduced. Thus, the stress amplitude acting on the accumulator is decreased, and the accumulator having the shorter remaining life becomes the accumulator to be used in the high pressure region. As a result, the life of the accumulators can be leveled. A time duration required for next replacement of the accumulator can be extended, so that the management cost of the hydrogen station can be more reduced.

Preferably, at least two accumulators are used in at least one of the low pressure region and the high pressure region whose pressure is higher than the low pressure region, and the gas supply system further includes a switching section that switches the accumulator to be used based on temperatures of the accumulators in such a manner that the accumulator having a lower temperature among the at least two accumulators is used.

There is a possibility that when a cycle of storing in/delivering to the accumulator becomes frequent, hydrogen whose temperature becomes high at the time of a storing step is delivered from the gas supply system to the filling facility such as a dispenser without being sufficiently cooled. Therefore, when the accumulator having the lower temperature among the at least two accumulators used in the same pressure region of one of the low pressure region and the high pressure region is used as described above, an increase in the temperature of the gas delivered from the accumulator unit can be suppressed. Thereby, a gas cooling load in a case where the gas is pre-cooled before leading the gas into the filling facility can be reduced. It is particularly effective in the hydrogen station where the gas is stored in the accumulator and supplied to the filling facility highly frequently.

Preferably, the accumulator unit includes a first accumulator to be used in a case where pressure of the tank is within a low pressure region serving as a range of predetermined low pressure, and a second accumulator to be used in a case where the pressure of the tank is within a high pressure region serving as a range of predetermined high pressure, the high pressure region being narrower than the low pressure region, the first accumulator is a steel container, and the second accumulator is a composite container made of a composite material which is different from an iron and steel material.

In a case where the pressure of the tank in the tank-equipped device is within the low pressure region, a large amount of the gas is delivered from the accumulator to the filling facility. Thus, the stress amplitude acting on the accumulator is increased and the fatigue life of the accumulator is easily shortened. Meanwhile, in a case where the pressure of the tank is within the high pressure region, the delivery amount of the gas from the accumulator to the filling facility is relatively reduced. Thus, the stress amplitude acting on the accumulator is decreased, and the fatigue life of accumulator is not easily shortened. Therefore, by using the steel container having high durability as the first accumulator to be used in the low pressure region, the life of the first accumulator can be extended. By using the composite container cheaper than the steel container as the second accumulator to be used in the high pressure region, an increase in cost of the accumulator unit can be suppressed. By using the steel container and the composite container together, the life of the first and second accumulators can be leveled, so that the replacement frequency of the accumulator can be reduced.

Preferably, the second accumulator is arranged on the upper side of the first accumulator.

With such a configuration, by arranging the second accumulator which is the composite container having relatively shorter life than the steel container on the upper side of the first accumulator, even in a case where there is a need for replacing the second accumulator, an operator can easily access the second accumulator and perform a replacement operation.

Preferably, a first frame surrounding the first accumulator, and a second frame surrounding the second accumulator are further provided, and the second frame is separably laminated on the upper side of the first frame.

With such a configuration, the second frame surrounding the second accumulator is separably laminated on the first frame surrounding the first accumulator. Thus, the second accumulator can be easily removed in a state where the second accumulator is surrounded by the second frame. In addition, the second accumulator can be removed from the upper side of the first accumulator by using a crane or the like. Thus, for example in comparison to a case where the second accumulator is removed by sliding in the horizontal direction, an operation space can be decreased.

Preferably, the accumulator unit further includes a third accumulator to be used in a case where the pressure of the tank is within a middle pressure region serving as a range of pressure between the low pressure region and the high pressure region.

With such a configuration, by using the three accumulators to be used in the three different pressure regions, the gas can be promptly supplied.

Preferably, other accumulator unit is connected to the accumulator unit.

With such a configuration, in comparison to a case where a large-sized accumulator is prepared, an amount of the gas to be stored in accordance with a demand amount of the gas can be easily adjusted.

A gas supply system according to a second aspect of the present invention is a gas supply system for supplying a gas to a filling facility that fills a tank of a tank-equipped device with the gas, the gas supply system including an accumulator unit that stores the gas, and a gas delivery section that delivers the gas to the accumulator unit, wherein the accumulator unit includes a first accumulator to be used in a case where pressure of the tank is within a low pressure region serving as a range of predetermined low pressure, and a second accumulator to be used in a case where the pressure of the tank is within a high pressure region serving as a range of predetermined high pressure, the high pressure region being narrower than the low pressure region, the first accumulator is a steel container, and the second accumulator is a composite container made of a composite material which is different from an iron and steel material.

In a case where the pressure of the tank in the tank-equipped device is within the low pressure region, a large amount of the gas is delivered from the accumulator to the filling facility. Thus, the stress amplitude acting on the accumulator is increased and the fatigue life of the accumulator is easily shortened. Meanwhile, in a case where the pressure of the tank is within the high pressure region, the delivery amount of the gas from the accumulator to the filling facility is relatively reduced. Thus, the stress amplitude acting on the accumulator is decreased, and the fatigue life of accumulator is not easily shortened. Therefore, by using the steel container not prone to fatigue upon a pressure change as the first accumulator to be used in the low pressure region, the life of the first accumulator can be extended. By using the composite container cheaper than the steel container as the second accumulator to be used in the high pressure region, the increase in the cost of the accumulator unit can be suppressed. By using the steel container and the composite container together, the life of the first and second accumulators can be leveled, so that the replacement frequency of the accumulator can be reduced.

A hydrogen station according to a third aspect of the present invention includes a filling facility, and the above gas supply system for supplying a hydrogen gas to the filling facility, wherein the filling facility fills a vehicle serving as a tank-equipped device with the hydrogen gas.

With such a configuration, the hydrogen gas is preliminarily stored in the accumulator of the accumulator unit and delivered to the vehicle such as a fuel cell vehicle according to need, so that the hydrogen gas can be promptly supplied.

An accumulator life judgment method according to a fourth aspect of the present invention is an accumulator life judgment method in a gas supply system for supplying a gas to a filling facility that fills a tank of a tank-equipped device with the gas, the gas supply system including a gas delivery section, an accumulator unit that stores the gas discharged from the gas delivery section, the accumulator unit having at least one accumulator, a first valve member that opens and closes a lead-in flow passage providing communication between the accumulator unit and the gas delivery section, and a second valve member that opens and closes a lead-out flow passage providing communication between the accumulator unit and the filling facility, the accumulator life judgment method including a step of repeatedly acquiring stress amplitude between stress acting on the accumulator in a state where the first valve member is closed and the second valve member is opened and stress acting on the accumulator in a state where the first valve member is opened and the second valve member is closed, a step of classifying the stress amplitude into a plurality of groups, and a step of judging life of the accumulator based on a fatigue degree obtained by obtaining values from the acquirement number of the stress amplitude for each of the groups and the breaking cycle number corresponding to the stress amplitude representing the group, and adding the values up for each of the groups.

In the accumulator life judgment method, focusing on the magnitude of the stress amplitude of the stress acting on the accumulator, the acquirement number of the stress amplitude is determined for each magnitude of the stress amplitude and used for judging the life of the accumulator. That is, the stress amplitude of the stress acting on the accumulator at the time of storing the gas in the accumulator and at the time of supplying the gas to the filling facility is classified into the plurality of groups by the magnitude thereof, and the life of the accumulator is judged based on the fatigue degree obtained by obtaining the values from the acquirement number of the stress amplitude for each of the groups and the breaking cycle number corresponding to the stress amplitude representing the group, and adding the values up for each of the groups. Thereby, while respectively individually considering fatigue life due to large stress amplitude of the stress acting on the accumulator and fatigue life due to small stress amplitude, the life of the accumulator can be more properly managed, so that the replacement frequency of the accumulator can be reduced. As a result, the management cost of the hydrogen station can be reduced.

Preferably, in the step of judging the life of the accumulator, it is judged that the accumulator comes to the end of the life in a case where the fatigue degree becomes a predetermined threshold value or more.

In this life judgment method, it is judged that the accumulator comes to the end of the life in a case where the fatigue degree becomes the predetermined threshold value or more. Thereby, when the threshold value is appropriately set in consideration with an environment where the accumulator is used or the like, the life of the accumulator can be furthermore properly managed, so that the replacement frequency of the accumulator can be more reduced.

A use method of a gas supply system according to a fifth aspect of the present invention is a use method of the gas supply system according to the first aspect, wherein the accumulator unit includes a first accumulator, and a second accumulator, the judging section determines remaining life of the first accumulator and remaining life of the second accumulator from the fatigue life, and one of the first accumulator and the second accumulator having the longer remaining life is used in a case where pressure of the tank is within a low pressure region serving as a range of predetermined low pressure, and the accumulator having the shorter remaining life is used in a case where the pressure of the tank is within a high pressure region serving as a range of predetermined high pressure, the high pressure region being narrower than the low pressure region.

In this use method, one of the first accumulator and the second accumulator having the longer remaining life becomes the accumulator to be used in the low pressure region. Meanwhile, in a case where the pressure of the tank is within the high pressure region, the delivery amount of the gas from the accumulator to the filling facility is relatively reduced. Thus, the stress amplitude acting on the accumulator is decreased, and the accumulator having the shorter remaining life becomes the accumulator to be used in the high pressure region. As a result, the life of the accumulators can be leveled. The time duration required for next replacement of the accumulator can be extended, so that the management cost of the hydrogen station can be more reduced.

A use method of a gas supply system according to a sixth aspect of the present invention is a use method of the gas supply system according to the first aspect, wherein at least two accumulators are used in at least one of the low pressure region and the high pressure region whose pressure is higher than the low pressure region, and the accumulator to be used is switched based on temperatures of the accumulators in such a manner that the accumulator having a lower temperature among the at least two accumulators is used.

In this use method, when the accumulator having the lower temperature among the at least two accumulators used in the same pressure region of one of the low pressure region and the high pressure region is used, the increase in the temperature of the gas delivered from the accumulator unit can be suppressed. Thereby, the gas cooling load in a case where the gas is pre-cooled before leading the gas into the filling facility can be reduced. It is particularly effective in the hydrogen station where the gas is stored in the accumulator and supplied to the filling facility highly frequently.

According to the gas supply system and the accumulator life judgment method of the present invention, the life of the accumulator can be properly managed. As a result, the life of the accumulator can be extended.

BRIEF DESCRIPTION OF THE DRAWINGS

FIG. 1 is a view showing a hydrogen station having a gas supply system according to an embodiment of the present invention.

DESCRIPTION OF THE PREFERRED EMBODIMENTS

Figure 2:
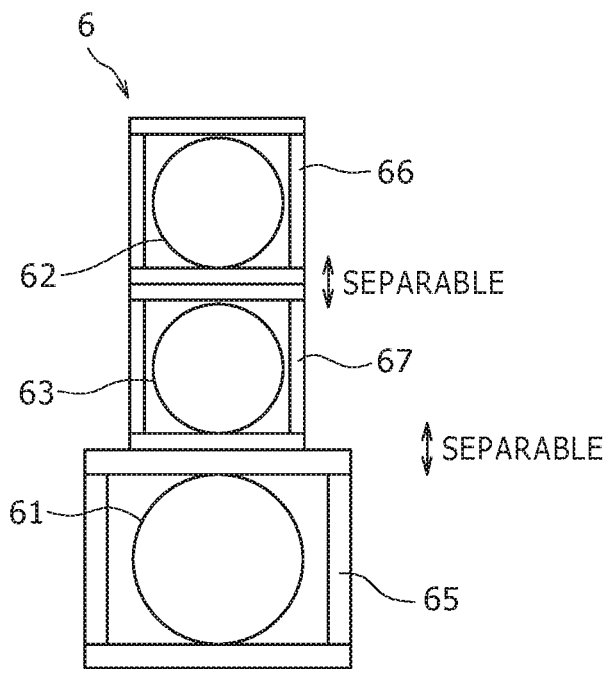
FIG. 2 is an illustrative view showing arrangement of accumulators in an accumulator unit of FIG. 1.

Hereinafter, an embodiment of the present invention will be described in further detail with reference to the drawings.

FIG. 1 is a view showing a hydrogen station 1 according to the embodiment of the present invention. The hydrogen station 1 includes a gas supply system 2, and a dispenser 3 serving as a filling facility. The gas supply system 2 is a system for supplying a hydrogen gas to the dispenser 3. The dispenser 3 is a filling facility that fills a tank C of a vehicle B serving as a tank-equipped device with the hydrogen gas. The vehicle B is for example a fuel cell vehicle. In this hydrogen station 1, the hydrogen gas is preliminarily stored in accumulators 61 to 63 of an accumulator unit 6 to be described later in the gas supply system 2 and delivered to the vehicle B via the dispenser 3 according to need, so that the hydrogen gas can be promptly supplied.

The gas supply system 2 includes the accumulator unit 6, a compressor unit 5 serving as a gas delivery section that delivers the hydrogen gas to the accumulator unit 6, a gas flow passage 7, a valve unit 8, pressure detection sections 9, a control section 10, and a pre-cool system 11.

The compressor unit 5 and the dispenser 3 communicate with each other via the gas flow passage 7. The accumulator unit 6 and the valve unit 8 are arranged in an intermediate part of the gas flow passage 7. In the gas flow passage 7, the hydrogen gas flows toward the dispenser 3. The pre-cool system 11 cools the hydrogen gas immediately before filling the tank C of the vehicle B from the dispenser 3. The pre-cool system 11 includes for example a heat exchanger, and by exchanging heat between the hydrogen gas and a coolant (such as brine), cools the hydrogen gas immediately before filling the tank C of the vehicle B from the dispenser 3.

The compressor unit 5 is formed from for example a reciprocating compressor or the like, and includes a drive section 51 and a compression section 52. The compression section 52 has a piston and a cylinder. The piston is driven by power of the drive section 51, and the hydrogen gas sent from a gas lead-in passage 13 is compressed in the cylinder. The compressed hydrogen gas is delivered to the accumulator unit 6 via the gas flow passage 7.

The accumulator unit 6 shown in FIG. 1 includes three accumulators (the first accumulator 61, the second accumulator 62, and the third accumulator 63). In the accumulators 61 to 63, the hydrogen gas discharged from the compressor unit 5 is stored.

Regarding these three accumulator units 61 to 63, the accumulator to be used is different depending on the magnitude of pressure of the hydrogen gas filling the tank C in such a manner that the tank C of the fuel cell vehicle B can be rapidly filled with the hydrogen gas in accordance with a predetermined filling protocol.

That is, the first accumulator 61 is used in a case where the pressure of the tank C (that is, the pressure of the hydrogen gas filling the tank C) is within a low pressure region serving as a range of predetermined low pressure. Hereinafter, the first accumulator 61 will be called as the "low pressure side accumulator 61".

The second accumulator 62 is used in a case where the pressure of the tank C is within a high pressure region serving as a range of predetermined high pressure, the high pressure region being narrower than the low pressure region. Hereinafter, the second accumulator 62 will be called as the "high pressure side accumulator 62".

The third accumulator 63 is used in a case where the pressure of the tank is within a middle pressure region serving as a range of pressure between the low pressure region and the high pressure region. Hereinafter, the third accumulator 63 will be called as the "middle pressure side accumulator 63".

For example, the low pressure side accumulator 61 is used in a case where the pressure of the tank C is within a pressure range from 0 to 50 MPa, the middle pressure side accumulator 63 is used in a case where the pressure of the tank C is within a pressure range from 50 to 60 MPa, and the high pressure side accumulator 62 is used in a case where the pressure of the tank C is within a pressure range from 60 to 70 MPa. However, these pressure ranges are appropriately set in consideration with use conditions or the like.

Figure 3:
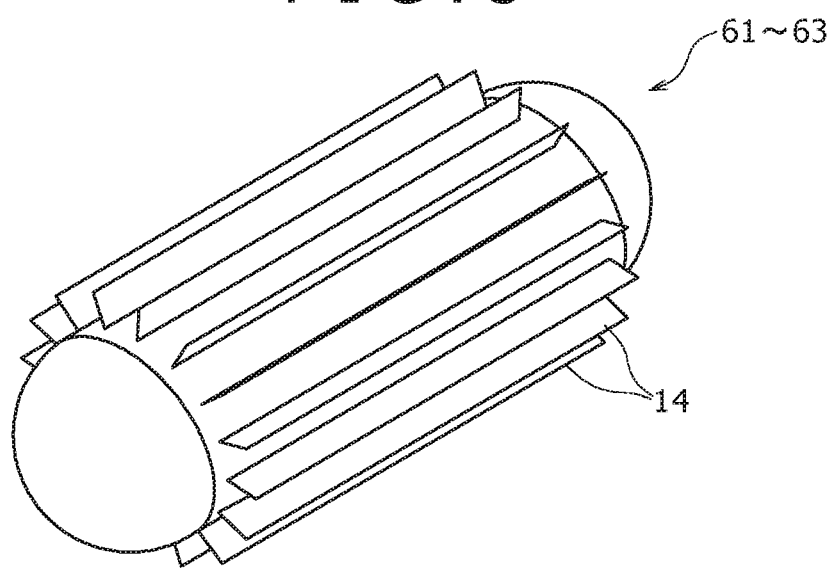
FIG. 3 is an enlarged perspective view of the accumulator of FIG. 2.

Each of the accumulators 61 to 63 is formed from for example an enclosed cylindrical container whose ends are both closed, the container having high pressure resistance (refer to FIG. 3).

In order to rapidly fill the tank C of the vehicle B with the hydrogen gas in accordance with the filling protocol, the plurality of accumulators is preferably utilized as in the present embodiment. However, as these accumulators, a composite container cheaper than a steel container containing an iron and steel material (such as a container made of plural materials like carbon fiber and aluminum) is thought to be utilized. Nevertheless, in a case where the pressure of the tank C in the vehicle B is within the low pressure region, a large amount of the hydrogen gas is supplied from the low pressure side accumulator 61 to the dispenser 3. Thus, stress amplitude acting on the low pressure side accumulator 61 is increased and fatigue life of the low pressure side accumulator 61 is easily shortened. Meanwhile, in a case where the pressure of the tank C is within the high pressure region, a supply amount of the hydrogen gas from the high pressure side accumulator 62 to the dispenser 3 is relatively reduced. Thus, stress amplitude acting on the high pressure side accumulator 62 is decreased, and fatigue life of the high pressure side accumulator 62 is not easily shortened.

Thus, in the present embodiment, as the low pressure side accumulator 61 (first accumulator) to be used in the low pressure region, the steel container made of the iron and steel material not prone to fatigue upon a pressure change is used. As the high pressure side accumulator 62 (second accumulator) to be used in the high pressure region whose pressure is higher than the low pressure region, the relatively cheap composite container is used. In the present embodiment, as the middle pressure side accumulator 63 (third accumulator) to be used in a case where the pressure of the tank C is within the middle pressure region serving as the range of the pressure between the low pressure region and the high pressure region, the relatively cheap composite container is also used. However, the present invention is not limited to this but the steel container may be used as the middle pressure side accumulator 63.

The composite container is a container containing a composite material serving as plural materials which are different from the iron and steel material. For example, the composite container is a cheap pressure-resistant container made of plural materials like carbon fiber and aluminum as described above. Specifically, the composite container is formed by winding carbon fiber on an outer peripheral surface of an aluminum liner (that is, a container main body part made of aluminum).

As shown in FIG. 2, the low pressure side accumulator 61, the middle pressure side accumulator 63, and the high pressure side accumulator 62 are arranged in a state where the accumulator whose pressure region to be used is lower is laminated on the lower side while being respectively surrounded by the frames 65 to 67. Therefore, the middle pressure side accumulator 63 and the high pressure side accumulator 62 formed from the composite container are arranged so as to be placed on the upper side of the low pressure side accumulator 61 formed from the steel container.

These frames 65 to 67 are hollow frame bodies having rectangular sections in which the accumulators 61 to 63 can be housed, for example manufactured by combining pillar shape steel materials. Hereinafter, the frame surrounding the low pressure side accumulator 61 (first accumulator) will be called as the "low pressure side frame 65" (first frame), the frame surrounding the middle pressure side accumulator 63 (third accumulator) will be called as the "middle pressure side frame 67" (third frame), and the frame surrounding the high pressure side accumulator 62 (second accumulator) will be called as the "high pressure side frame 66" (second frame).

The middle pressure side frame 67 and the high pressure side frame 66 are laminated on the low pressure side frame 65 separably upward from the low pressure side frame 65. The high pressure side frame 66 is laminated on the middle pressure side frame 67 separably upward from the middle pressure side frame 67. The low pressure side frame 65 and the middle pressure side frame 67 are coupled and the middle pressure side frame 67 and the high pressure side frame 66 are coupled respectively by using fastening members such as bolts and nuts.

It should be noted that a heat sink 14 may be attached to each of the above accumulators 61 to 63 for heat emission as shown in FIG. 3. The heat sink 14 has for example a configuration that a plurality of metal plates having high thermal conductivity is arranged in a radial manner on an outer peripheral surface of each of the accumulators 61 to 63. However, with a heat emission property, other modes may be applied.

The gas flow passage 7 has a lead-in flow passage 71 providing communication between the accumulators 61 to 63 and the compressor unit 5, and a lead-out flow passage 72 providing communication between the accumulators 61 to 63 and the dispenser 3. Each of the lead-in flow passage 71 and the lead-out flow passage 72 is branched into three in the vicinity of the accumulators 61 to 63, and connected to the accumulators 61 to 63. In the present embodiment, each of the accumulators 61 to 63 has one connection port, and the lead-in flow passage 71 and the lead-out flow passage 72 are connected to the connection port. Thus, the lead-in flow passage 71 and the lead-out flow passage 72 are merged in the vicinity of the accumulators 61 to 63. However, the present invention is not limited to this. As another example, for example, the lead-in flow passage 71 and the lead-out flow passage 72 may be respectively connected to two connection ports separately provided in each of the accumulators 61 to 63.

The valve unit 8 includes a plurality of first valve members 81 and a plurality of second valve members 82 in order to individually open and close the lead-in side and lead-out side flow passages for each of the accumulators 61 to 63. Specifically, the first valve members 81 are respectively arranged in branched parts connected to the accumulators 61 to 63 in the lead-in flow passage 71 so as to open and close the lead-in flow passage 71 providing communication between the accumulators 61 to 63 and the compressor unit 5. The second valve members 82 are respectively arranged in branched parts connected to the accumulators 61 to 63 in the lead-out flow passage 72 so as to open and close the lead-out flow passage 72 providing communication between the accumulators 61 to 63 and the dispenser 3.

On the upstream side of the first valve members 81 in the lead-in flow passage 71 (on the right side of the first valve members 81 in FIG. 1), check valves 12 that hinder a reverse flow of the hydrogen gas are provided. Thereby, while allowing lead-in of the hydrogen gas from the lead-in flow passage 71 to the accumulators 61 to 63, a flow reverse to the lead-in can be regulated. On the downstream side of the second valve members 82 in the lead-out flow passage 72 (on the right side of the second valve members 82 in FIG. 1), check valves 12 are also provided. Thus, while allowing lead-out of the hydrogen gas from the accumulators 61 to 63 to the lead-out flow passage 72, a flow reverse to the lead-out can be regulated.

The pressure detection sections 9 are pressure sensors attached to hydrogen gas flow passage parts connected to the accumulators 61 to 63. Internal pressure of the accumulators 61 to 63 is detected by the pressure detection sections 9. It should be noted that strain gauges may be attached to the outer peripheral surfaces of the accumulators 61 to 63 as the pressure detection sections. In this case, by using the magnitude of strain on the outer peripheral surfaces of the accumulators 61 to 63 measured by the strain gauges, the stress amplitude of the accumulators 61 to 63 can be determined.

The control section 10 controls the compressor unit 5, the valve unit 8, and the pre-cool system 11. The control section 10 includes an acquiring section 10a that repeatedly acquires the stress amplitude regarding the stress acting on the accumulators 61 to 63 at the time of storing the hydrogen gas and at the time of supplying the hydrogen gas to the dispenser 3 in order to judge the life of the accumulators 61 to 63 based on the number of a change in the stress acting on the accumulators 61 to 63, a classifying section 10b that classifies the stress amplitude, and a judging section 10c that judges the life of the accumulators 61 to 63.

The acquiring section 10a repeatedly acquires the stress amplitude between the stress acting on the accumulators 61 to 63 at the time of supplying the hydrogen gas from the accumulators 61 to 63 to the dispenser 3 and the stress acting on the accumulators 61 to 63 at the time of storing the hydrogen gas in the accumulators 61 to 63.

Specifically, the acquiring section 10a acquires the stress amplitude of the accumulators 61 to 63 in each case in a period from the time when storage of the hydrogen gas is completed (that is, when the first valve members 81 are shifted from an opened state to a closed state with the second valve members 82 in a closed state) to the time when supply of the next hydrogen gas to the dispenser 3 is completed (that is, the second valve members 82 are shifted from an opened state to a closed state with the first valve members 81 in a closed state). It should be noted that the acquiring section 10a may acquire the stress amplitude in each case in a period from the time when the supply of the hydrogen gas is completed to the time when the storage of the hydrogen gas is completed.

The classifying section 10b classifies the acquired stress amplitude into a plurality of groups by the magnitude of the stress amplitude.

The judging section 10c judges the life of the accumulators 61 to 63 based on a fatigue degree obtained by respectively calculating the acquirement number which is the acquirement number of the stress amplitude for each of the groups, obtaining values from the acquirement number for each of the groups and the breaking cycle number corresponding to the stress amplitude representing the group, and adding the values up for each of the groups.

The control section 10 formed as above judges the life of the accumulators 61 to 63 in the following procedure. Firstly, the acquiring section 10a repeatedly acquires the stress amplitude in a predetermined period.

Specifically, stress amplitude $\Delta\sigma_i$ of each of the accumulators 61 to 63 is determined from a pressure change $\Delta P$ as follows.

Figure 4:
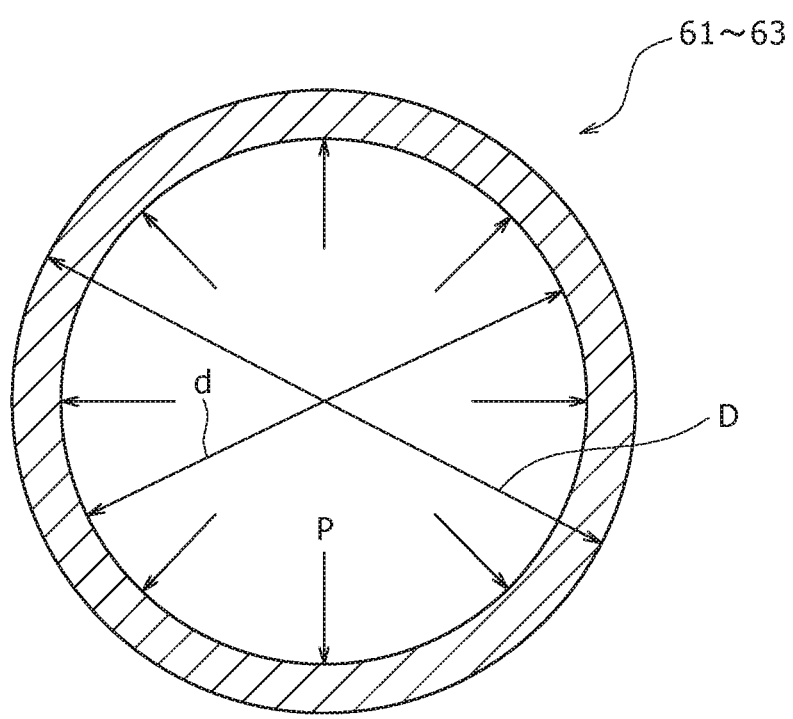
FIG. 4 is a sectional view of the accumulator.

Firstly, as shown in FIG. 4, in a case where internal pressure in each of the accumulators 61 to 63 formed from a cylindrical container is P, the pressure change $\Delta P$ is determined as in the following expression 1:

$$\Delta P = P\max - P\min \quad \text{(Expression 1)}$$

wherein

Pmax denotes pressure inside each of the accumulators 61 to 63 at a time point when storage from the compressor unit 5 to each of the accumulators 61 to 63 is completed (that is, internal pressure when the first valve member 81 is shifted from an opened state to a closed state with the second valve member 82 in a closed state), and Pmin denotes pressure inside each of the accumulators 61 to 63 at a time point when supply from each of the accumulators 61 to 63 to the dispenser 3 is completed (that is, internal pressure the second valve member 82 is shifted from an opened state to a closed state with the first valve member 81 in a closed state).

Meanwhile, in a case where an inner diameter of each of the accumulators 61 to 63 is d and an outer diameter is D, maximum stress $\sigma$ generated in each of the accumulators 61 to 63 at the internal pressure P is expressed by using K ($=D/d$) as:

$$\sigma = ((K^2+1)/(K^2-1)+1) \times P \quad \text{(Expression 2)}$$

When the stress amplitude $\Delta\sigma_i$ is determined by applying the above pressure change $\Delta P$ to P of this expression 2, the following expression 3 is obtained:

$$\Delta\sigma_i = ((K^2+1)/(K^2-1)+1) \times \Delta P \quad \text{(Expression 3)}$$

It should be noted that $\Delta\sigma_i$ may be decided in consideration with a correction terms adding mean stress.

Next, the classifying section 10b classifies the stress amplitude $\Delta\sigma_i$ into a plurality of groups by the magnitude of the stress amplitude.

The judging section 10c calculates the acquirement number $n_i$ of the stress amplitude in a predetermined period for each of the groups.

Figure 5:
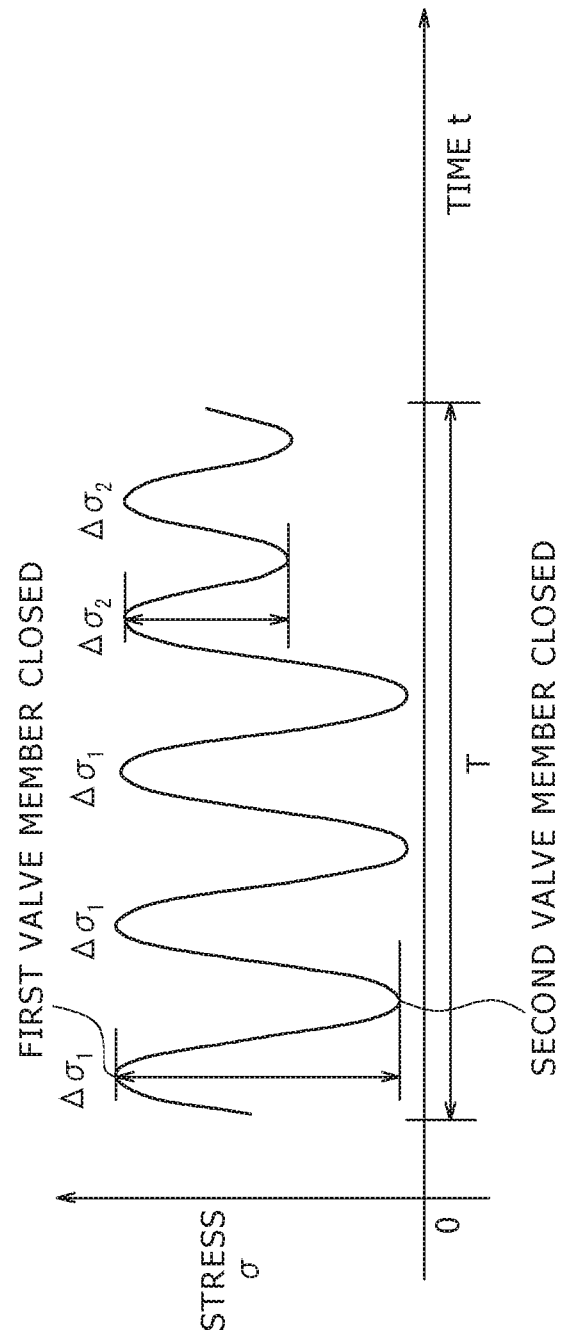
FIG. 5 is a graph of stress amplitude of stress acting on the accumulator.

A range of the number of the groups and the magnitude of the stress amplitude $\Delta\sigma_i$ included in each of the groups is appropriately set by length of the predetermined period, the magnitude of the pressure change $\Delta P$ acting on each of the accumulators 61 to 63, and the like. For example, as shown in FIG. 5, in a case where the tank is fully filled until the tank C of the vehicle B is brought from a blank state to a maximum filling amount of the hydrogen gas in a predetermined period T, large stress amplitude such as $\Delta\sigma_1$ is generated. In a case where the tank is filled until the tank C is brought for example from a state where half the hydrogen gas still remains to the maximum filling amount, small stress amplitude such as $\Delta\sigma_2$ is generated. The judging section 10c individually calculates the acquirement number $n_1$ of the stress amplitude $\Delta\sigma_1$ and the acquirement number $n_2$ of the stress amplitude $\Delta\sigma_2$ in the predetermined period T.

The judging section 10c determines, for each of the groups, numeric values $n_i/N_i$ obtained by dividing the acquirement number $n_i$ of the stress amplitude $\Delta\sigma_i$ for each of the groups by the breaking cycle number $N_i$ corresponding to the stress amplitude representing the group.

As the stress amplitude representing the group, for example, a median value or a mean value of the stress amplitude in each of the groups is used. However, the representing stress amplitude may be set by other criteria.

Further, the judging section 10c determines a fatigue degree $\Sigma n_i/N_i$ by adding the determined numeric values $n_i/N_i$ up for each of the groups. In a case where a value of the fatigue degree $\Sigma n_i/N_i$ becomes a predetermined threshold value or more, the judging section 10c judges that each of the accumulators 61 to 63 comes to the end of the life. In a case where the threshold value is for example 1, the judging section judges that each of the accumulators 61 to 63 comes to the end of the life when the following expression 4 is established.

$$\sum \frac{n_i}{N_i} = \frac{n_1}{N_1} + \frac{n_2}{N_2} + \frac{n_3}{N_3} + \ldots = 1 \quad \text{(Expression 4)}$$

When the life of a constant stress amplitude test regarding the stress $\sigma_i$ is $N_i$, a value indicating fatigue damage by $\sigma_i$ when $\sigma_i$ emerges by $n_i$ cycles in changing stress is given by $n_i/N_i$ as a cycle ratio. Fatigue damage regarding each stress level is independent for each stress level, and as being added linearly, is expressed by the fatigue degree $\Sigma n_i/N_i$ which is the sum of the values $n_i/N_i$. Therefore, the fatigue damage can be expressed as the expression 4. It is thought that when this fatigue degree $\Sigma n_i/N_i$ becomes the predetermined threshold value such as 1, that is, when $\Sigma n_i/N_i = 1$, the accumulator is broken.

It should be noted that although the threshold value is theoretically 1, the threshold value may be appropriately changed in accordance with measurement conditions. For example, the threshold value may be set to a value less than 1 or the like.

Next, a method of filling the vehicle B with the hydrogen gas by using the above hydrogen station 1 will be described.

At the time of filling the tank C of the vehicle B shown in FIG. 1 with the hydrogen gas, after the hydrogen gas preliminarily sent from a gas supply source (not shown) via the gas lead-in passage 13 is compressed by the compressor unit 5, the hydrogen gas is delivered to the accumulator unit 6 by opening the first valve members 81 in a state where the second valve members 82 of the valve unit 8 are closed, and the hydrogen gas whose pressure is adjusted in accordance with the pressure region is stored in each of the accumulators 61 to 63. Specifically, the hydrogen gas is stored at the pressure of 50 MPa in the low pressure side accumulator 61 (pressure range from 0 to 50 MPa), the hydrogen gas is stored at the pressure of 60 MPa in the middle pressure side accumulator 63 (pressure range from 50 to 60 MPa), and the hydrogen gas is stored at the pressure of 70 MPa in the high pressure side accumulator 62 (pressure range from 60 to 70 MPa).

When the vehicle B is carried into the hydrogen station 1, by opening the second valve members 82 in a state where the first valve members 81 of the valve unit 8 are closed, the hydrogen gas is supplied from the accumulator unit 6 to the dispenser 3, and the dispenser 3 fills the tank C of the vehicle B with the hydrogen gas in accordance with the predetermined filling protocol.

At this time, in the accumulator unit 6, the hydrogen gas is firstly supplied from the low pressure side accumulator 61 (pressure range from 0 to 50 MPa) to the dispenser 3. The dispenser 3 indirectly measures the pressure in the tank C of the vehicle B. When the dispenser judges that a pressure difference between the tank C and the low pressure side accumulator 61 becomes a predetermined value or less, the dispenser sends an instruction to stop supply of the hydrogen gas from the low pressure side accumulator 61 to the gas supply system 2.

Successively, the gas supply system 2 releases the middle pressure side accumulator 63 (pressure range from 50 to 60 MPa), and the hydrogen gas is supplied to the dispenser 3. Thereby, a pressure difference between the dispenser 3 (or the middle pressure side accumulator 63) and the tank C of the vehicle B is restored, and a flow rate of the hydrogen gas for filling the tank C is ensured. When the pressure of the tank C of the vehicle B is increased and the dispenser 3 judges that the pressure difference between the middle pressure side accumulator 63 and the tank C becomes the predetermined value or less, the gas supply system 2 stops supply of the hydrogen gas from the middle pressure side accumulator 63 and further releases the high pressure side accumulator 62 (pressure range from 60 to 70 MPa), so that the hydrogen gas is supplied. Thereby, the pressure difference between the dispenser 3 and the tank C is ensured, and the tank is filled with a sufficient amount of the hydrogen gas. When it is judged that the pressure of the tank C becomes a set value, supply of the hydrogen gas from the gas supply system 2 is stopped.

As described above, in the gas supply system 2, by switching the low pressure side accumulator 61 (pressure range from 0 to 50 MPa), the middle pressure side accumulator 63 (pressure range from 50 to 60 MPa), and the high pressure side accumulator 62 (pressure range from 60 to 70 MPa) in accordance with the three pressure regions of the tank C of the vehicle B, the dispenser 3 can efficiently fill the tank C with the hydrogen gas in accordance with the filling protocol.

Figure 6:
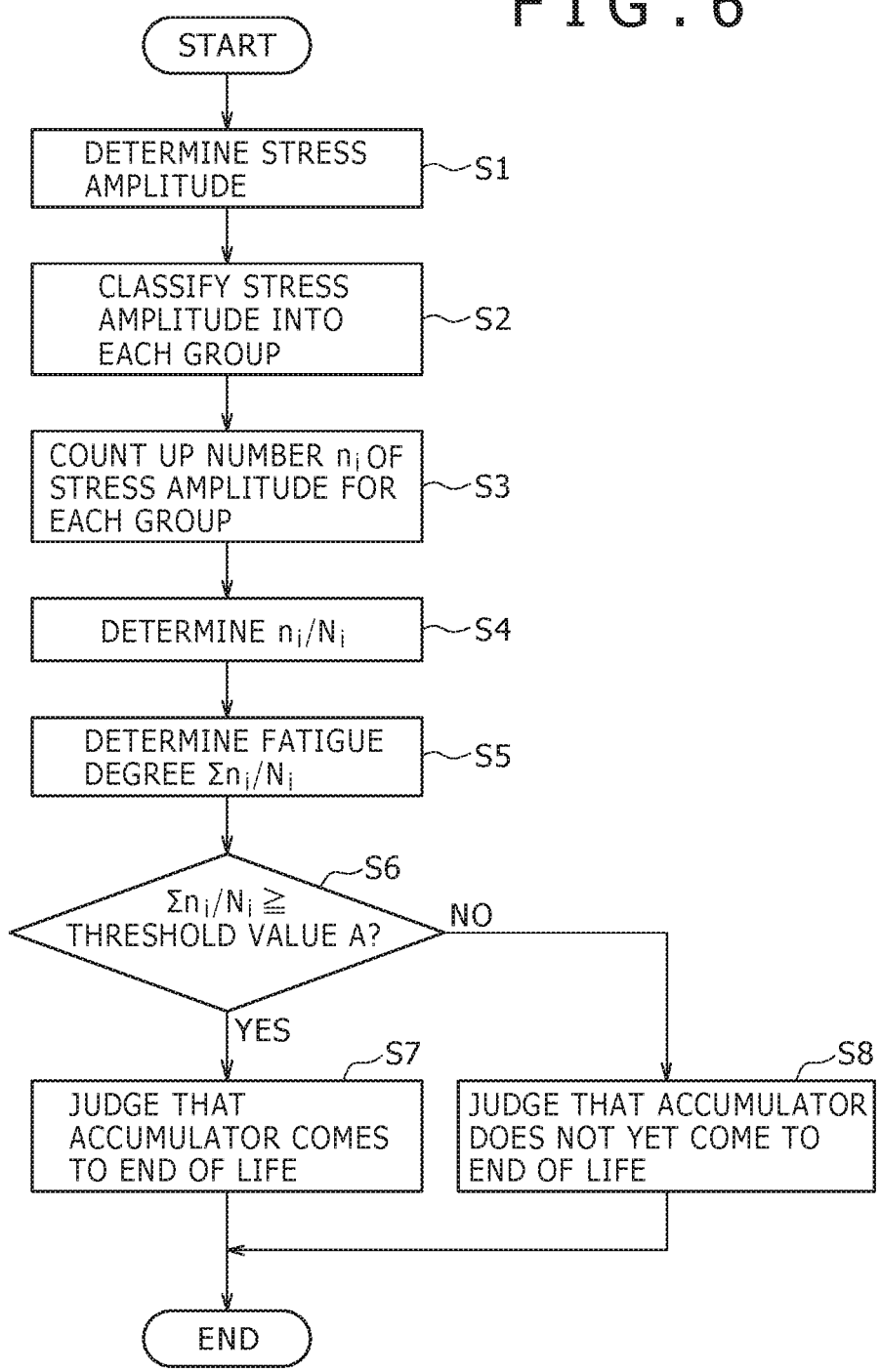
FIG. 6 is a flowchart of an accumulator life judgment method according to the embodiment of the present invention.

Next, a method of judging the life of each of the accumulators 61 to 63 will be described with reference to a flowchart of FIG. 6.

Firstly, the acquiring section 10a of the control section 10 determines the stress amplitude $\Delta\sigma_i$ in each of the accumulators 61 to 63 in accordance with (Expression 3) based on the pressure change $\Delta P$ as described above (Step S1).

Next, the classifying section 10b classifies the stress amplitude $\Delta\sigma_i$ into the plurality of groups by the magnitude of the stress amplitude (Step S2).

The judging section 10c counts up the acquirement number $n_i$ of the stress amplitude for each of the groups in the predetermined period as described above (Step S3).

Next, the judging section 10c determines, for each of the groups, the numeric values $n_i/N_i$ obtained by dividing the acquirement number $n_i$ of the stress amplitude $\Delta\sigma_i$ for each of the groups by the breaking cycle number $N_i$ corresponding to the stress amplitude representing the group as described above (Step S4).

Next, the judging section 10c determines the fatigue degree $\Sigma n_i/N_i$ by adding the numeric values $n_i/N_i$ up as described above (Step S5).

After that, the judging section 10c judges whether or not the value of $\Sigma n_i/N_i$ becomes a predetermined threshold value A or more as described above (Step S6). The judging section judges that the corresponding one of the accumulators 61 to 63 comes to the end of the life in a case where the value of $\Sigma n_i/N_i$ becomes the predetermined threshold value A or more (Step S7), and judges that the accumulator does not yet come to the end of the life in other cases (Step S8).

In the above manner, after individually determining the values $n_i/N_i$ which are evaluation values of the fatigue life for each magnitude of the stress amplitude of the stress acting on the accumulators 61 to 63, by adding the values $n_i/N_i$ up and determining the fatigue degree $\Sigma n_i/N_i$, the judging section 10c can precisely judge the life of the accumulators 61 to 63.

(Operations and Effects)

(1) In the gas supply system 2 and the accumulator fatigue judgment method of the present embodiment, focusing on the magnitude of the stress amplitude $\Delta\sigma_i$ of the stress acting on each of the accumulators 61 to 63, the acquirement number $n_i$ of the stress amplitude $\Delta\sigma_i$ is determined for each magnitude of the stress amplitude $\Delta\sigma_i$ and used for judging the life of each of the accumulators 61 to 63. That is, the classifying section 10b classifies the stress amplitude $\Delta\sigma_i$ of the stress acting on each of the accumulators 61 to 63 at the time of storing the hydrogen gas in each of the accumulators 61 to 63 and at the time of supplying the hydrogen gas to the dispenser 3 into the plurality of groups by the magnitude of the stress amplitude. Successively, the judging section 10c determines the fatigue degree by obtaining the values from the acquirement number of the stress amplitude $\Delta\sigma_i$ for each of the groups and the breaking cycle number corresponding to the stress amplitude representing the group, and adding the values up for each of the groups. Specifically, the fatigue degree is determined by adding the values $n_i/N_i$ up for all the groups, the values being obtained by dividing the acquirement number $n_i$ of the stress amplitude $\Delta\sigma_i$ which is obtained for each of the groups by the breaking cycle number $N_i$ corresponding to the representing stress amplitude $\Delta\sigma_i$ in each of the groups. The judging section 10c judges the life of each of the accumulators 61 to 63 based on the fatigue degree $\Sigma n_i/N_i$. Thereby, while respectively individually considering the fatigue life due to large stress amplitude of the stress acting on each of the accumulators 61 to 63 and the fatigue life due to small stress amplitude, the life of each of the accumulators 61 to 63 can be more properly managed, so that replacement frequency of the accumulator can be reduced. As a result, management cost of the hydrogen station 1 can be reduced.

It should be noted that in the present embodiment, the example in which the accumulator unit includes the three accumulators 61 to 63 is shown. However, the present invention is not limited to this. When the accumulator unit has at least one accumulator, the life of the accumulator can be properly managed, so that the replacement frequency of the accumulator can be reduced.

(2) In a case where the pressure of the tank C is within the low pressure region, a large amount of the gas is supplied from the low pressure side accumulator 61 (first accumulator) to the dispenser 3. Thus, the stress amplitude acting on the low pressure side accumulator 61 is increased and the fatigue life of the low pressure side accumulator 61 is easily shortened. Meanwhile, in a case where the pressure of the tank C is within the high pressure region, the supply amount of the hydrogen gas from the high pressure side accumulator 62 (second accumulator) to the dispenser 3 is relatively reduced. Thus, the stress amplitude acting on the high pressure side accumulator 62 is decreased, and the fatigue life of high pressure side accumulator 62 is not easily shortened. Therefore, in the gas supply system 2 of the present embodiment, by using the steel container having high durability as the low pressure side accumulator 61 (first accumulator) to be used in the low pressure region, the life of the low pressure side accumulator 61 can be extended. By using the composite container cheaper than the steel container as the high pressure side accumulator 62 (second accumulator) to be used in the high pressure region, an increase in cost of the accumulator unit 6 can be suppressed. By using the steel container and the composite container together, the life of the low pressure side accumulator 61 and the high pressure side accumulator 62 can be leveled, so that the replacement frequency of the accumulator can be reduced.

(3) In the gas supply system 2 of the present embodiment, the accumulator unit 6 further includes the middle pressure side accumulator 63 (third accumulator) to be used in a case where the pressure of the tank C is within the middle pressure region serving as the range of the pressure between the low pressure region and the high pressure region. Thus, by using the accumulators to be used in the three different pressure regions, that is, the low pressure side accumulator 61, the middle pressure side accumulator 63, and the high pressure side accumulator 62, the gas can be promptly supplied.

By using the composite container cheaper than the steel container as the middle pressure side accumulator 63, even with the accumulator unit 6 including the three accumulators 61 to 63 to be used in the three different pressure regions, the increase in the cost of the accumulator unit 6 can be suppressed.

It should be noted that in the above embodiment, the accumulator unit 6 including the middle pressure side accumulator 63 is shown. However, the middle pressure side accumulator 63 may be omitted.

(4) In the gas supply system 2 of the present embodiment, by arranging the middle pressure side accumulator 63 and the high pressure side accumulator 62 which are the composite container having relatively shorter life than the steel container on the upper side of the low pressure side accumulator 61 on the side of the first unit 60, even in a case where there is a need for replacing the middle pressure side accumulator 63 or the high pressure side accumulator 62 formed from the composite container, an operator can easily access these accumulators 62, 63 and perform a replacement operation.

(5) In the gas supply system 2 of the present embodiment, the middle pressure side frame 67 (third frame) surrounding the middle pressure side accumulator 63 and the high pressure side frame 66 (second frame) surrounding the high pressure side accumulator 62 are separably laminated on the upper side of the low pressure side frame 65 (first frame) surrounding the low pressure side accumulator 61. Thus, the middle pressure side accumulator 63 and the high pressure side accumulator 62 can be easily removed in a state where the accumulators are respectively surrounded by the frames 67, 66. In addition, the middle pressure side accumulator 63 and the high pressure side accumulator 62 can be removed from the upper side of the low pressure side accumulator 61 by using a crane or the like. Thus, for example in comparison to a case where the middle pressure side accumulator 63 and the high pressure side accumulator 62 are removed by sliding in the horizontal direction, an operation space can be decreased.

Explanation of Other Embodiments (A) In the gas supply system 2 of the above embodiment, the accumulator unit 6 includes the three accumulators 61 to 63, and the pressure regions where the accumulators 61 to 63 are used are preliminarily set. However, the present invention is not limited to this.

For example, in a gas supply system having a configuration that an accumulator unit includes a plurality of accumulators and any one of the accumulators is used as another embodiment of the present embodiment, in a case where the pressure of the tank C of the vehicle B is within the low pressure region, a large amount of the hydrogen gas is supplied from the accumulator used at the time to the dispenser 3. Thus, stress amplitude acting on the accumulator is increased and the accumulator is prone to fatigue. Therefore, as a modified example of the present invention, for example, remaining life of the plurality of accumulators may be determined by utilizing the above method of managing the life of the accumulator, and the accumulator to be used in the low pressure region may be decided in accordance with the remaining life. Specifically, the accumulator unit 6 may include for example a first accumulator and a second accumulator as the plurality of accumulators, one of the first accumulator and the second accumulator may be used in the low pressure region, and the other may be used in the high pressure region whose pressure is higher than the low pressure region. In such a modified example, for example, all the same composite container (or all the same steel container) may be used as the first accumulator and the second accumulator.

In this modified example, the judging section 10c determines values $\Sigma n_i/N_i$ of the first accumulator and values $\Sigma n_i/N_i$ of the second accumulator and further determines remaining life of the first accumulator and remaining life of the second accumulator based on the values $\Sigma n_i/N_i$. One of the first accumulator and the second accumulator having the longer remaining life is used in a case where the pressure of the tank C of the vehicle B is within the low pressure region serving as the range of the predetermined low pressure. Meanwhile, the accumulator having the shorter remaining life is used in the high pressure region in a case where the pressure of the tank C is within the high pressure region serving as the range of the predetermined high pressure, the high pressure region being narrower than the low pressure region. With this configuration, one of the first accumulator and the second accumulator having the longer remaining life becomes the accumulator to be used in the low pressure region. Meanwhile, in a case where the pressure of the tank C is within the high pressure region, the supply amount of the hydrogen gas from the accumulator to the dispenser 3 (filling facility) is relatively reduced. Thus, the stress amplitude acting on the accumulator is decreased, and the accumulator having the shorter remaining life becomes the accumulator to be used in the high pressure region. As a result, the life of the accumulators can be leveled. A time duration required for next replacement of the accumulator can be extended, so that the management cost of the hydrogen station 1 can be more reduced.

(B) It should be noted that the plurality of accumulators may be three or more accumulators. In that case, one of the accumulators having the longest remaining life may also be used in a case where the pressure of the tank C of the vehicle B is within the low pressure region.

In the gas supply system 2 of the above embodiment, the accumulator unit 6 has one accumulator for each pressure region to be used, that is, one for the low pressure side, one for the middle pressure side, and one for the high pressure side. However, the present invention is not limited to this. As further another embodiment of the present invention, as shown in FIG. 7, a plurality of accumulators may be provided in any of the pressure regions (for example, two low pressure side accumulators 61 may be provided in the low pressure region), and the different accumulator to be used may be used in accordance with temperatures of the accumulators.

Figure 7:
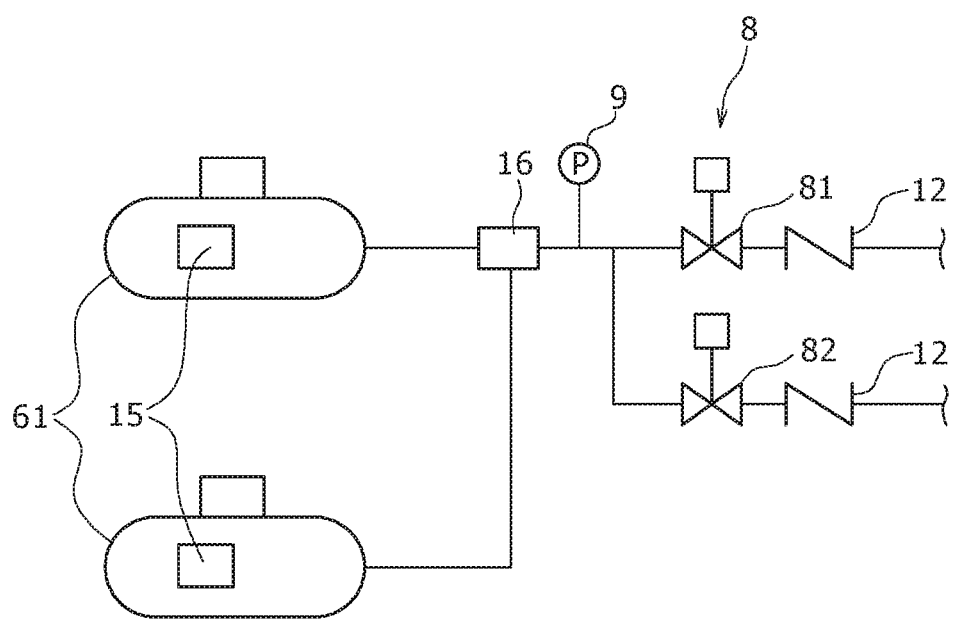
FIG. 7 is a view showing an example in which two low pressure side accumulators are switched and used in a gas supply system according to a modified example of the present invention.

In this example of FIG. 7, temperature detection sections 15 are attached to places suitable for detecting the temperatures on outer peripheral surfaces or the like of the accumulators 61. Between the first valve member 81 and the second valve member 82 and the two low pressure side accumulators 61, a switching section 16 that switches a flow passage of the hydrogen gas to any of the two low pressure side accumulators 61 is provided. The switching section 16 is controlled by the control section 10 to switch.

The control section 10 controls the switching section 16 to switch the accumulator 61 to be used based on the temperatures of the plurality of accumulators 61 in such a manner that the accumulator 61 having the lower temperature among the plurality of accumulators 61 is used. Specifically, the temperature detection sections 15 detect the temperatures of the low pressure side accumulators 61, and the control section 10 controls the switching section 16 to switch the flow passage of the hydrogen gas to the accumulator having the lower temperature among the two low pressure side accumulators 61. Thereby, the accumulator having the lower temperature among the two low pressure side accumulators 61 is selected and used. Thus, an increase in a temperature of the gas supplied from the accumulator unit 6 to the dispenser 3 is suppressed. Therefore, a hydrogen gas cooling load in the pre-cool system 11 can be reduced. In addition, heat of the low pressure side accumulator 61 whose temperature is increased is emitted to the external air while the accumulator is not used, so that the accumulator is naturally cooled. In particular, the low pressure side accumulator is efficiently cooled by using the heat sink 14 of FIG. 3.

It should be noted that in a case of this modified example, at least two low pressure side accumulators 61 are required and three or more low pressure side accumulators may be provided.

Figure 8:
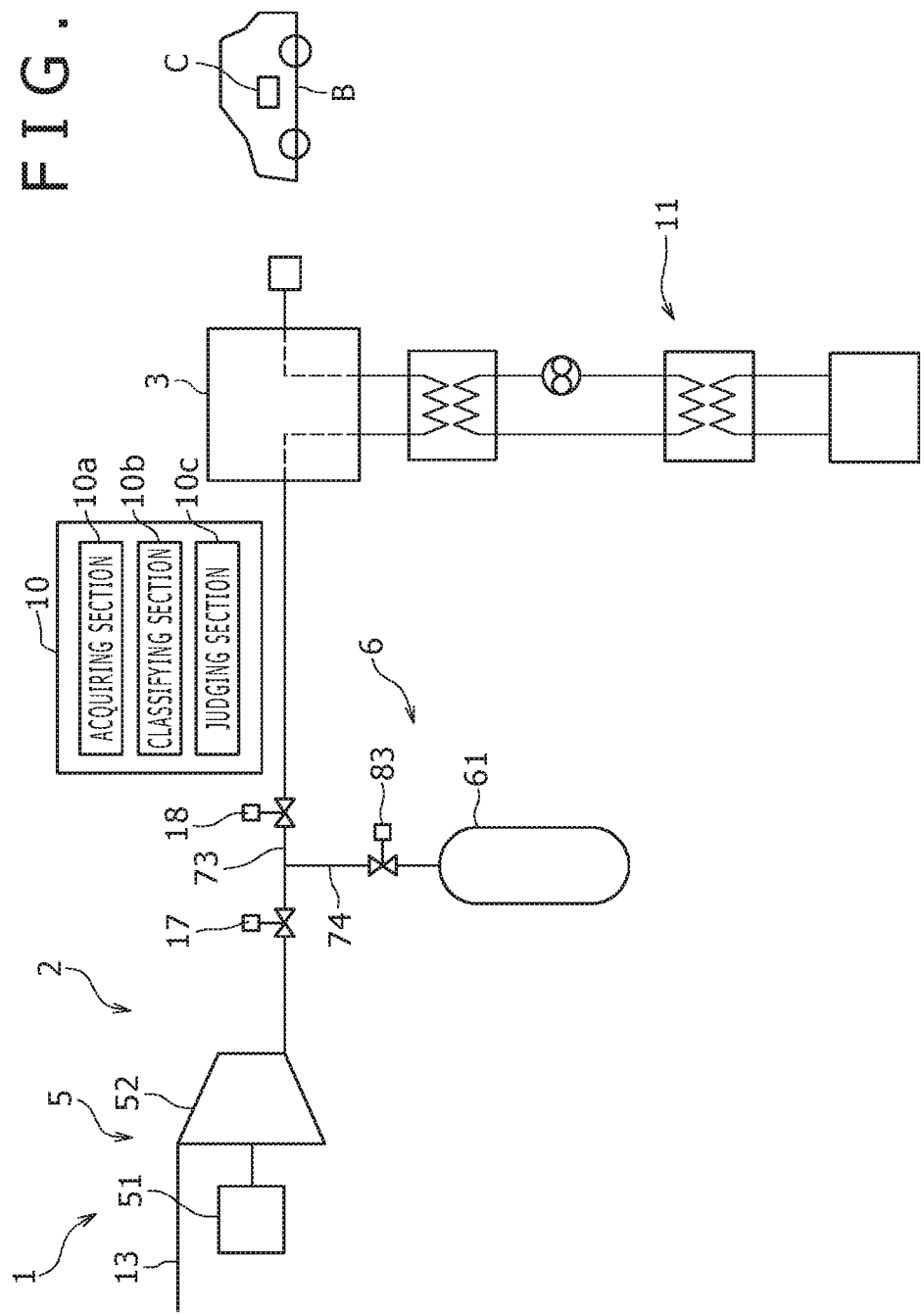
FIG. 8 is a view showing an example in which a gas flow passage has a shunt in a gas supply system according to another modified example of the present invention.

(C) As further another embodiment of the present invention, as shown in FIG. 8, the gas supply system 2 may be able to directly supply the hydrogen gas from the compressor unit 5 to the dispenser 3 via a flow passage 73. In this gas supply system 2 shown in FIG. 8, the accumulator 61 communicates with an intermediate part of the flow passage 73 running from the compressor unit 5 to the dispenser 3 via a branching passage 74. Closing valves 17, 18 are provided on the upstream side and the downstream side of the branching passage 74 in the flow passage 73. A closing valve 83 is also provided in an intermediate part of the branching passage 74.

In this gas supply system 2 shown in FIG. 8, when supply of the hydrogen gas from the compressor unit 5 to the dispenser 3 is insufficient, the hydrogen gas is supplemented from the accumulator 61. When the hydrogen gas is sufficient, the hydrogen gas is stored in the accumulator 61. When the hydrogen gas is sufficiently stored inside the accumulator 61, the closing valve 83 is closed. Even with this system, by using the life judgment method, the life of the accumulator can be properly managed.

Figure 9:
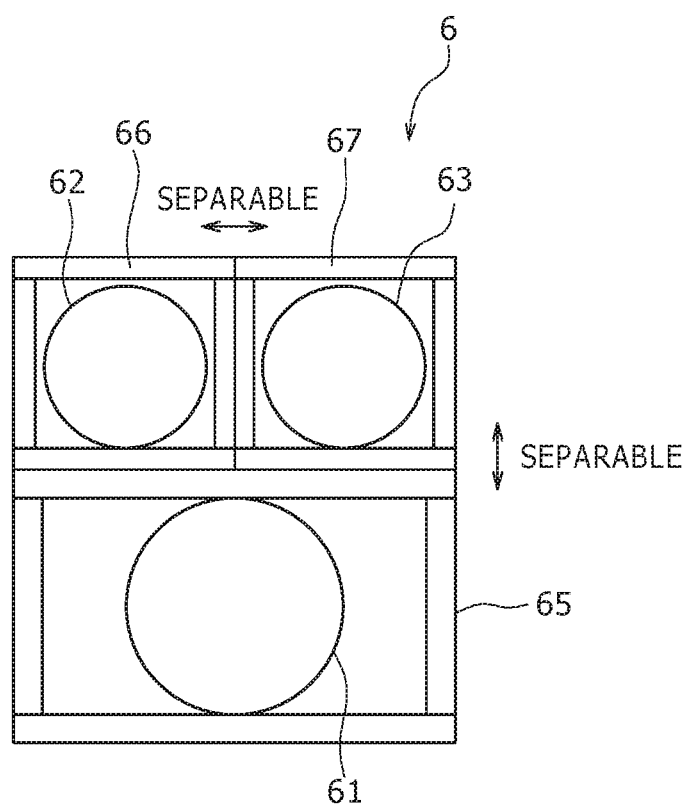
FIG. 9 is a view showing an example in which a middle pressure side accumulator and a high pressure side accumulator are arranged side by side on the upper side of a low pressure side accumulator in a gas supply system according to still another modified example of the present invention.

(D) In the gas supply system 2 of the above embodiment, the accumulator unit 6 has a laminating structure of three layers in which the low pressure side accumulator 61, the middle pressure side accumulator 63, and the high pressure side accumulator 62 are laminated in order from the bottom as shown in FIG. 2. However, the present invention is not limited to this. As further another embodiment of the present invention, as shown in FIG. 9, the middle pressure side accumulator 63 and the high pressure side accumulator 62 respectively formed from the composite container may be arranged side by side on the upper side of the low pressure side accumulator 61 formed from the steel container. In this case, the middle pressure side frame 67 surrounding the middle pressure side accumulator 63 and the high pressure side frame 66 surrounding the high pressure side accumulator 62 may also separably be coupled to the low pressure side frame 67 surrounding the low pressure side accumulator 61 by bolts or the like. Further, the middle pressure side frame 67 and the high pressure side frame 66 may be separably coupled to each other. Thereby, the middle pressure side accumulator 63 and the high pressure side accumulator 62 are highly easily replaced.

Figure 10:
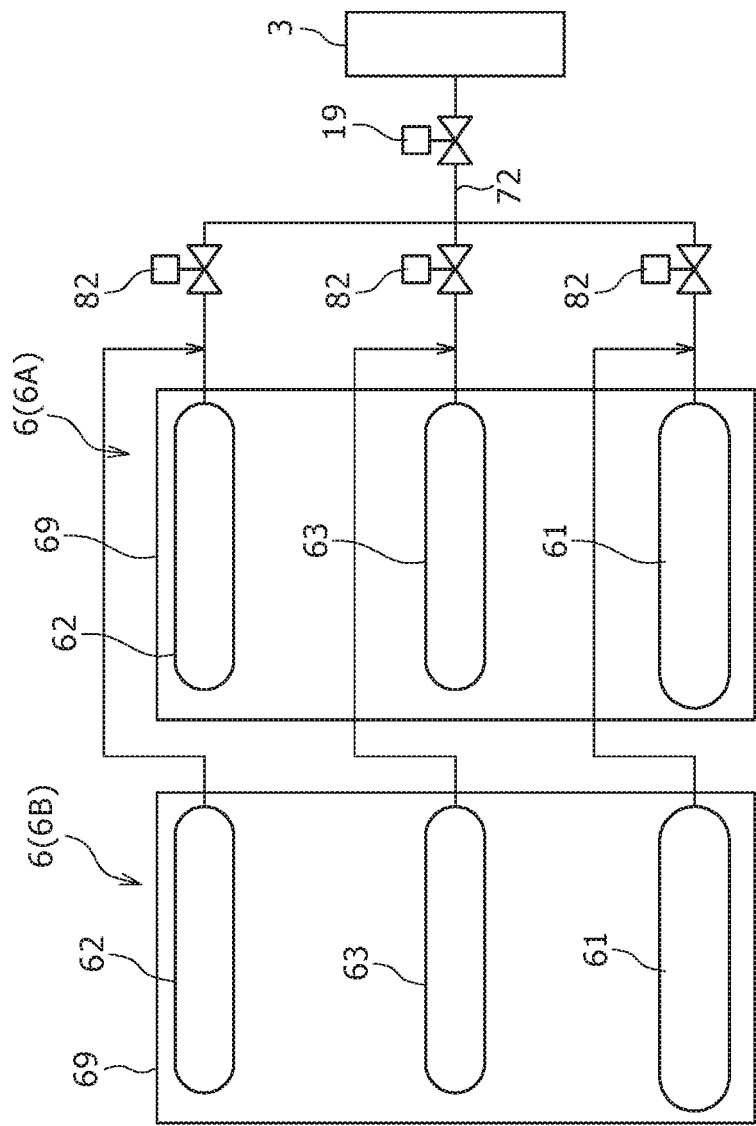
FIG. 10 is a view showing an example in which a plurality of accumulators is provided in a gas supply system according to yet another modified example of the present invention.

(E) The gas supply system 2 of the above embodiment includes one accumulator unit 6. However, as further another embodiment of the present invention, as shown in FIG. 10, another accumulator unit 6B may be connected to an accumulator unit 6A.

Each of the accumulator units 6A, 6B includes the low pressure side accumulator 61, the middle pressure side accumulator 63, and the high pressure side accumulator 62 as well as the above embodiment. The accumulators 61 to 63 of the accumulator unit 6B are respectively connected to parts between the accumulators 61 to 63 of the accumulator unit 6A and the second valve members 82 in the lead-out flow passage 72. It should be noted that in FIG. 10, the lead-in flow passage 71 and the first valve members 81 of FIG. 1 are omitted for simplification. However, the accumulators 61 to 63 of the accumulator unit 6B are respectively connected to parts between the accumulators 61 to 63 of the accumulator unit 6A and the first valve members 81 in the lead-in flow passage 71. By preparing the plurality of accumulator units 6A, 6B, in comparison to a case where one large-sized accumulator unit is prepared, an amount of the hydrogen gas to be stored in accordance with a demand amount of the hydrogen gas can be easily adjusted.

The embodiments of the present invention are described above. However, the present invention is not limited to the above embodiments but various changes can be made.

For example, in the above embodiments, as one example of the fatigue degree, the fatigue degree $\Sigma n_i/N_i$ determined by adding the values $n_i/N_i$ up for all the groups, the values being obtained by dividing the acquirement number $n_i$ of the stress amplitude $\Delta\sigma_i$ which is obtained for each of the groups by the breaking cycle number $N_i$ corresponding to the representing stress amplitude $\Delta\sigma_i$ in each of the groups is described as an example. However, the present invention is not limited to this. In the present invention, the fatigue degree is only required to be obtained by obtaining the values from the acquirement number $n_i$ of the stress amplitude $\Delta\sigma_i$ for each of the groups and the breaking cycle number $N_i$ corresponding to the stress amplitude representing the group, and adding the values up for each of the groups. The fatigue degree may be obtained by other computational expressions. For example, as further another embodiment of the present invention, a predetermined coefficient $k_i$ may be set for each of the groups for the purpose of weighing or the like, and the fatigue degree may be $\Sigma(n_i/N_i) \times k_i$.

In the above embodiments, as one example of the gas delivery section that delivers the gas to the accumulator unit 6, the compressor unit 5 is described as an example. However, the present invention is not limited to this. As long as the gas can be delivered, various devices can be used as the gas delivery section. For example, a water electrolysis device that generates a hydrogen gas by electrolysis of water can also be used as the gas delivery section. Further, a device that generates a hydrogen gas from liquid hydrogen can also be used as the gas delivery section.

What is claimed is:

1. A gas supply system for supplying a gas to a filling facility that fills a tank of a tank-equipped device with the gas, the gas supply system comprising:
   an accumulator unit that stores the gas, the accumulator unit having at least one accumulator;
   a gas delivery section that delivers the gas to said accumulator unit;
   a first valve member that opens and closes a lead-in flow passage providing communication between said accumulator unit and said gas delivery section;
   a second valve member that opens and closes a lead-out flow passage providing communication between said accumulator unit and the filling facility;
   an acquiring section that repeatedly acquires stress amplitude between stress acting on the accumulator in a state where said first valve member is closed and said second valve member is opened and stress acting on the accumulator in a state where said first valve member is opened and said second valve member is closed;
   a classifying section that classifies the stress amplitude into groups, the number of the groups being based on at least a period over which the stress amplitude is measured and a magnitude of a pressure change; and
   a judging section that judges life of the accumulator based on a fatigue degree obtained by obtaining values from an acquirement number of the stress amplitude for each of the groups and a breaking cycle number corresponding to the stress amplitude representing the group, and adding the values up for each of the groups, wherein
   the filling facility supplies the gas from the accumulator unit to the tank-equipped device.

2. The gas supply system according to claim 1, wherein said accumulator unit includes a first accumulator, and a second accumulator,
   said judging section determines remaining life of the first accumulator and remaining life of the second accumulator from a fatigue life, and
   one of the first accumulator and the second accumulator having a longer remaining life is used in a case where pressure of the tank is within a low pressure region serving as a range of predetermined low pressure, and the accumulator having a shorter remaining life is used in a case where the pressure of the tank is within a high pressure region serving as a range of predetermined high pressure, the high pressure region being narrower than the low pressure region.

3. The gas supply system according to claim 1, wherein at least two accumulators are used in at least one of a low pressure region and a high pressure region whose pressure is higher than the low pressure region, and
   the gas supply system further comprises a switching section that switches the accumulator to be used based on temperatures of the accumulators in such a manner that the accumulator having a lower temperature among the at least two accumulators is used.

4. The gas supply system according to claim 1, wherein said accumulator unit includes a first accumulator to be used in a case where pressure of the tank is within a low pressure region serving as a range of predetermined low pressure, and a second accumulator to be used in a case where the pressure of the tank is within a high pressure region serving as a range of predetermined high pressure, the high pressure region being narrower than the low pressure region,
   said first accumulator is a steel container, and
   said second accumulator is a composite container made of a composite material which is different from an iron and steel material.

5. The gas supply system according to claim 4, wherein said second accumulator is arranged on an upper side of said first accumulator.

6. The gas supply system according to claim 4, further comprising:
   a first frame surrounding said first accumulator; and
   a second frame surrounding said second accumulator, wherein
   said second frame is separably laminated on an upper side of said first frame.

7. The gas supply system according to claim 4, wherein said accumulator unit further includes a third accumulator to be used in a case where the pressure of the tank is within a middle pressure region serving as a range of pressure between the low pressure region and the high pressure region.

8. The gas supply system according to claim 1, wherein another accumulator unit is connected to said accumulator unit.

9. A gas supply system for supplying a gas to a filling facility that fills a tank of a tank-equipped device with the gas, the gas supply system comprising:
   an accumulator unit that stores the gas; and
   a gas delivery section that delivers the gas to the accumulator unit, wherein
   said accumulator unit includes a first accumulator to be used in a case where pressure of the tank is within a low pressure region serving as a range of predetermined low pressure, and a second accumulator to be used in a case where the pressure of the tank is within a high pressure region serving as a range of predetermined high pressure, the high pressure region being narrower than the low pressure region,
   said first accumulator is a steel container,
   said second accumulator is a composite container made of a composite material which is different from an iron and steel material, and
   said gas supply system successively switches from said first accumulator to said second accumulator when the pressure of the tank of the tank-equipped device changes from being within the low pressure region to being within the high pressure region.

10. A hydrogen station comprising:
    a filling facility; and
    the gas supply system according to claim 1 for supplying a hydrogen gas to said filling facility, wherein
    said filling facility fills a vehicle serving as a tank-equipped device with the hydrogen gas.

11. An accumulator life judgment method in a gas supply system for supplying a gas to a filling facility that fills a tank of a tank-equipped device with the gas, the gas supply system including a gas delivery section, an accumulator unit that stores the gas discharged from the gas delivery section, the accumulator unit having at least one accumulator, a first valve member that opens and closes a lead-in flow passage providing communication between the accumulator unit and the gas delivery section, and a second valve member that opens and closes a lead-out flow passage providing communication between the accumulator unit and the filling facility, the accumulator life judgment method comprising:

repeatedly acquiring stress amplitude between stress acting on the accumulator in a state where the first valve member is closed and the second valve member is opened and stress acting on the accumulator in a state where the first valve member is opened and the second valve member is closed;

classifying the stress amplitude into groups, the number of the groups being based on at least a period over which the stress amplitude is measured and a magnitude of a pressure change; and judging the life of the accumulator based on a fatigue degree obtained by obtaining values from an acquirement number of the stress amplitude for each of the groups and a breaking cycle number corresponding to the stress amplitude representing the group, and adding the values up for each of the groups, wherein the filling facility supplies the gas from the accumulator unit to the tank-equipped device.

12. The accumulator life judgment method according to claim 11, wherein in said step of judging the life of the accumulator, it is judged that the accumulator comes to the end of the life in a case where the fatigue degree becomes a predetermined threshold value or more.

13. A use method of the gas supply system according to claim 1, wherein the accumulator unit includes a first accumulator, and a second accumulator, the judging section determines remaining life of the first accumulator and remaining life of the second accumulator from a fatigue life, and one of the first accumulator and the second accumulator having a longer remaining life is used in a case where pressure of the tank is within a low pressure region serving as a range of predetermined low pressure, and the accumulator having a shorter remaining life is used in a case where the pressure of the tank is within a high pressure region serving as a range of predetermined high pressure, the high pressure region being narrower than the low pressure region.

14. A use method of the gas supply system according to claim 1, wherein at least two accumulators are used in at least one of a low pressure region and a high pressure region whose pressure is higher than the low pressure region, and the accumulator to be used is switched based on temperatures of the accumulators in such a manner that the accumulator having a lower temperature among the at least two accumulators is used.

15. The gas supply system according to claim 1, wherein the accumulator unit includes at least a first accumulator that is a steel container and is used in a case where pressure of the tank is within a low pressure region serving as a range of predetermined low pressure; and a second accumulator that is a composite container, which is made of a composite material that is different from an iron and steel material, and is used in a case where the pressure of the tank is within a high pressure region serving as a range of predetermined high pressure, the high pressure region being narrower than the low pressure region, the judging section determines remaining life of said first accumulator and remaining life of said second accumulator from a fatigue life, one of said first accumulator and said second accumulator having a longer remaining life is used in a case where pressure of the tank is within the low pressure region, and the accumulator having a shorter remaining life is used in a case where the pressure of the tank is within the high pressure region, and the gas supply system further comprises:
a first frame surrounding said first accumulator; and
a second frame surrounding said second accumulator, wherein said second frame is separably laminated on the upper side of said first frame.

16. The accumulator life judgment method according to claim 11, wherein the accumulator unit includes at least a first accumulator that is a steel container and is used in a case where pressure of the tank is within a low pressure region serving as a range of predetermined low pressure; and a second accumulator that is a composite container, which is made of a composite material that is different from an iron and steel material, and is used in a case where the pressure of the tank is within a high pressure region serving as a range of predetermined high pressure, the high pressure region being narrower than the low pressure region, the judging section determines remaining life of said first accumulator and remaining life of said second accumulator from a fatigue life, one of said first accumulator and said second accumulator having a longer remaining life is used in a case where pressure of the tank is within the low pressure region, and the accumulator having a shorter remaining life is used in a case where the pressure of the tank is within the high pressure region, and the gas supply system further comprises:
a first frame surrounding said first accumulator; and
a second frame surrounding said second accumulator, wherein said second frame is separably laminated on the upper side of said first frame.

* * * * *